No. 652,486.

R. M. OWEN.
MOTOR VEHICLE.
(Application filed Dec. 19, 1899.)

Patented June 26, 1900.

(No Model.)

5 Sheets—Sheet 1.

Witnesses,
Charles V. Schott
J. R. McQuigg

Inventor,
Raymond M. Owen.
by Luther G. Hopper,
Attorney.

No. 652,486. Patented June 26, 1900.
R. M. OWEN.
MOTOR VEHICLE.
(Application filed Dec. 19, 1899.)

(No Model.) 5 Sheets—Sheet 3.

Witnesses,
Charles V. Schiff
J. R. McQuigg

Inventor,
Raymond M. Owen,
by
Luther G. Hopper,
Attorney.

No. 652,486. Patented June 26, 1900.
R. M. OWEN.
MOTOR VEHICLE.
(Application filed Dec. 19, 1899.)

(No Model.) 5 Sheets—Sheet 4.

WITNESSES:
Charles V. Schott
J. R. McQuigg

INVENTOR.
Raymond M. Owen,
BY
Luther G. Hopper,
ATTORNEY.

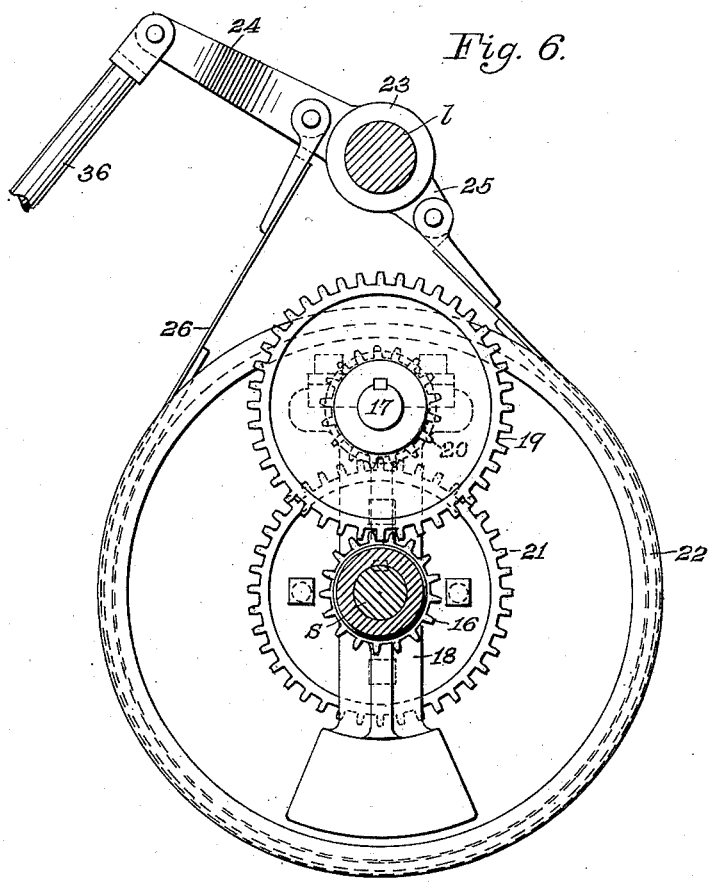

UNITED STATES PATENT OFFICE.

RAYMOND M. OWEN, OF CLEVELAND, OHIO.

MOTOR-VEHICLE.

SPECIFICATION forming part of Letters Patent No. 652,486, dated June 26, 1900.

Application filed December 19, 1899. Serial No. 740,905. (No model.)

*To all whom it may concern:*

Be it known that I, RAYMOND M. OWEN, a citizen of the United States, residing at Cleveland, in the county of Cuyahoga and State of Ohio, have invented certain new and useful Improvements in Motor-Vehicles, of which the following is a specification.

This invention relates to automobile vehicles, and has for its object improvement in the mechanism for transmitting power in carriages, wagons, boats, &c., which are driven by a suitable motor carried on board; and it consists in improved means for changing and controlling the speed and for starting, stopping, and reversing the motion of the vehicle.

The said improvements as applied to a motor-wagon are illustrated in the accompanying drawings, in which—

Figure 1:
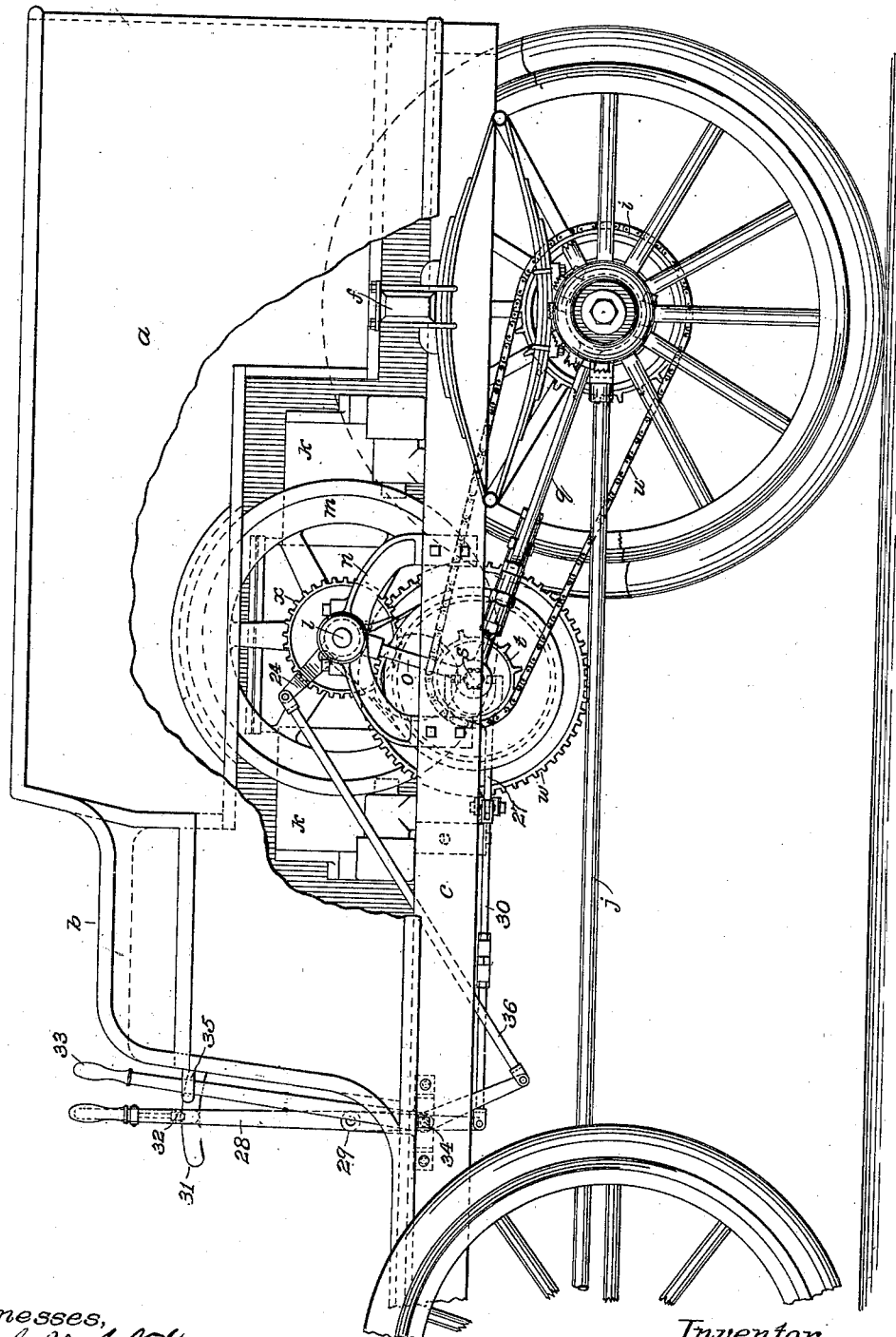
Figure 2:
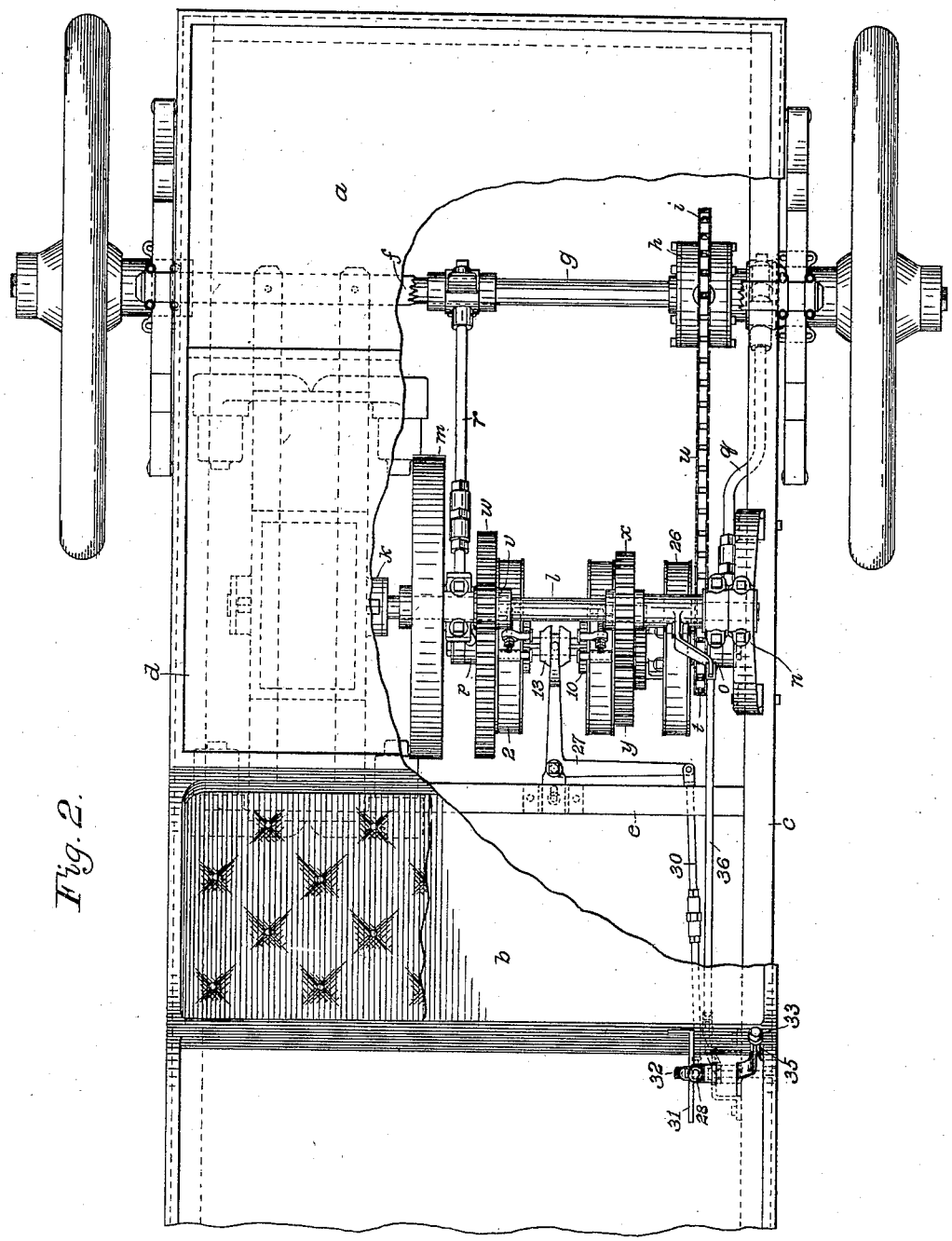
Figure 3:
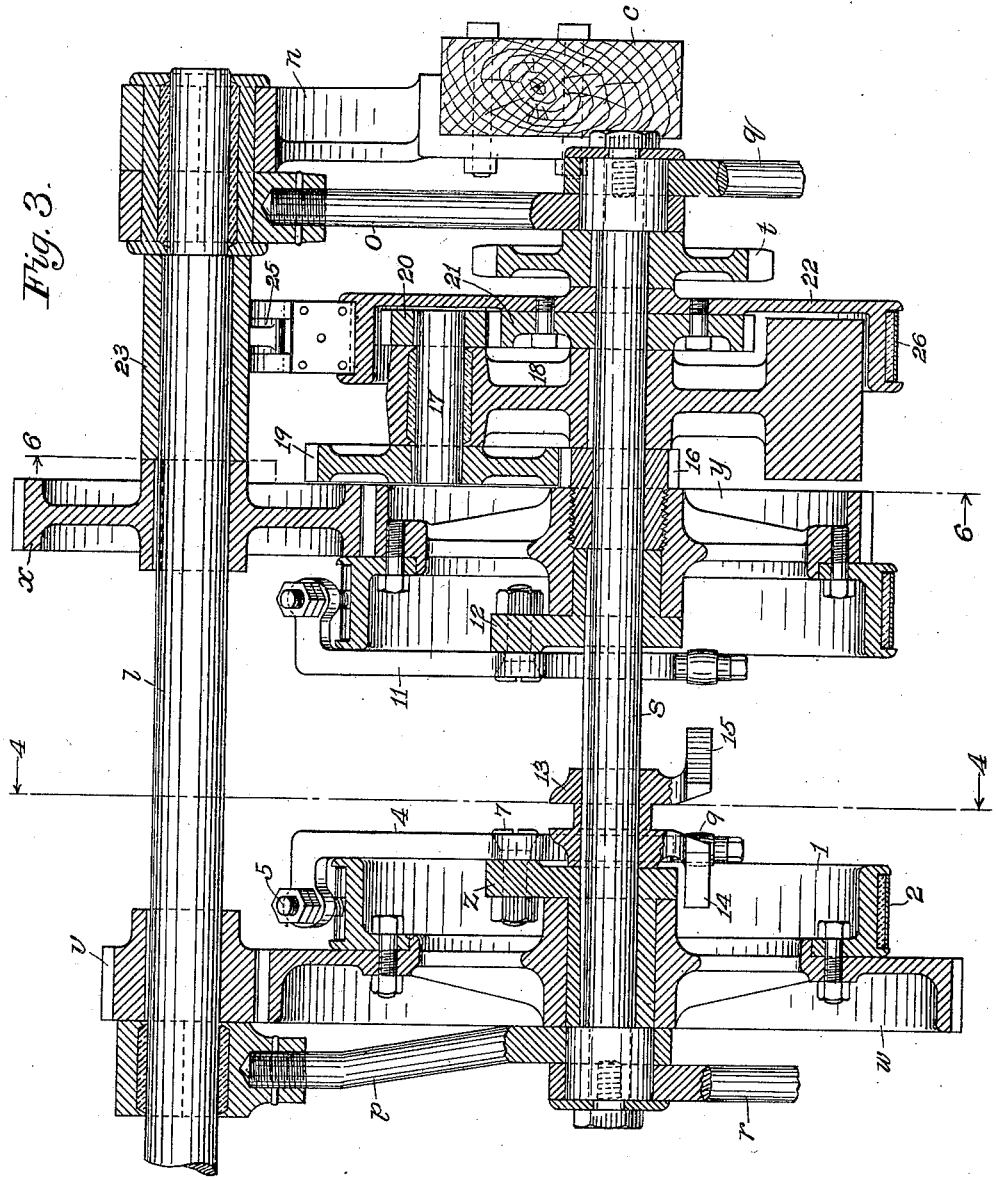
Figure 4:
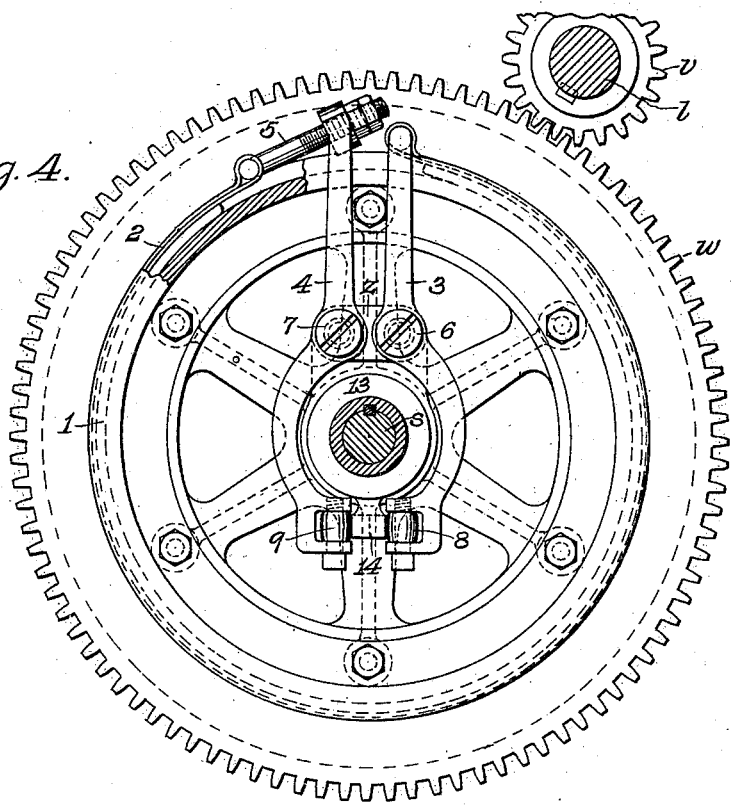
Figure 5:
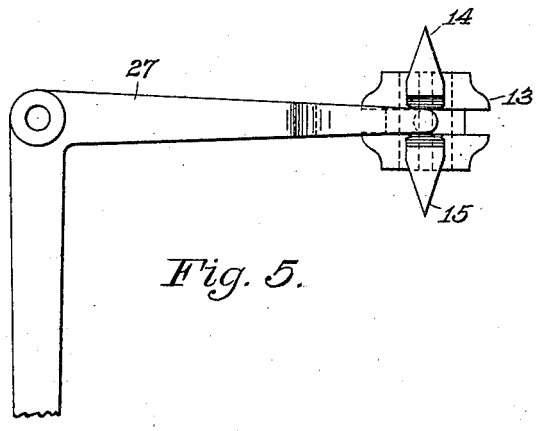

Figure 1 is a side elevation of a motor-wagon with part of the body thereof broken away, and Fig. 2 is a plan view of the same with part of the body broken away to show the transmission mechanism. Fig. 3 is a front elevation of the motor-shaft and counter-shaft with the transmission mechanism shown in section thereon. Fig. 4 is a section on line 4 4 of Fig. 3, showing the clutch mechanism. Fig. 5 is a plan view of the slide-block and forked elbow-lever which operate the clutches. Fig. 6 is a section on line 6 6 of Fig. 3, showing the reversing-gear.

The reference-letter $a$ represents the body of a motor-wagon, which may be of any suitable or convenient form and may be covered or open-topped, as desired. At least one seat should be provided, as shown at $b$. A frame, preferably resting upon springs, supports the body and the greater portion of the mechanism and consists of side rails $c$ and $d$, suitably connected together at their ends and by cross-pieces, such as $e$ and $f$. The driving-axle $g$ carries the two rear wheels of the vehicle and is provided with the usual compensating gear at $h$, on which the sprocket-wheel $i$ is preferably, though not necessarily, mounted. The front axle and steering mechanism may be of any style adaptable to the wagon; but struts, such as $j$, Fig. 1, should be provided to join the front and rear axles.

A motor $k$ is secured to one side of the frame in such a position that its main shaft $l$ extends across the wagon parallel to the rear axle. Said motor is preferably a gasolene-engine; but any motor fitted to the service required of it may be employed. A fly-wheel $m$ is shown on the motor-shaft, and the outboard end of said shaft is supported by a pedestal $n$, resting on the frame.

Suspended from the motor-shaft by rods $o$ and $p$ and braced to the rear axle by adjustable struts $q$ and $r$ is a counter-shaft $s$, on which is secured a sprocket-wheel $t$, carrying a sprocket-chain $u$, which drives the rear axle through the medium of the sprocket-wheel $i$ and the compensating gear. The said rods $o$ and $p$ and struts $q$ and $r$ have loose bearings at both ends, so that the counter-shaft may swing somewhat around the motor-shaft when the frame is raised or depressed in relation to the axles. Both of the struts $q$ and $r$ are made in two parts, joined by sleeves or turnbuckles having right and left handed screw-threads and lock-nuts, as shown, for the purpose of regulating the tension of the sprocket-chain.

Mounted upon the motor-shaft is a pinion $v$ and a larger toothed gear-wheel $x$, engaging, respectively, with the toothed wheels $w$ and $y$, which are arranged to run loosely on the counter-shaft when the wagon is at rest; but either wheel may be clamped to the counter-shaft by means of a light and effective friction clutch mechanism, which I will now proceed to describe, thus driving the vehicle forward at either one of two different speeds, according as one or the other of the said wheels is made to revolve the counter-shaft.

Referring to Figs. 3 and 4, it will be noticed that the wheel $w$ is journaled loosely upon a sleeve $z$, which sleeve is keyed to the counter-shaft. The wheel $w$ carries securely fastened to it, concentric with the shaft, a clutch-ring 1, encircled by a band 2, preferably of steel, sprung into position, so that its tendency is to open out away from the ring and secured at one end to the laterally-projecting end of the lever-arm 3. The other end of the said band is secured to an adjusting-bolt 5, provided with nuts and passing through an eye in the end of the lever-arm 4, similar and opposed to the arm 3. The said band may be lined with leather or other suitable material to increase its adhesion. The said lever-arms are fulcrumed, respectively, on pins 6 and 7, made fast to a flange on the sleeve $z$, and curving to avoid the shaft and slide-block, and are provided with rollers 8 and 9, journaled on pins between jaws in the lower ends of the respective lever-arms. The wheel $y$ is provided with a clutch mechanism similar to that described above for wheel $w$, which is operated by arms 10 and 11, fulcrumed to a sleeve 12, keyed to the shaft in such a position that the lever-arms of the respective clutches are directly opposite each other.

A slide-block 13, keyed to the counter-shaft, but free to slide endwise thereon between the clutches, is provided with a circumferential groove to engage an operating-lever and has two wedge-shaped arms 14 and 15, projecting oppositely lengthwise of the shaft and so located that when the block is moved along the shaft the sharp edge of one of the wedges enters between the rollers on the arms of one of the clutches and forces them apart until the arm of the slide-block has entered so far that the rollers bear against the flat parallel sides of said arm, as in Fig. 3, in which position the clutch-band is drawn tightly about the ring, and the slide-block has no tendency to release it, thus clamping either the gear-wheel $w$ or the wheel $y$, according as the slide-block is forced toward the one or the other, to the counter-shaft.

A reversing arrangement is provided working, preferably, in conjunction with the higher-speed mechanism, as herein shown; but it is possible and quite feasible to attach it to the lower-speed mechanism and in either case to proportion the gearing so as to produce a desirable rate of speed. A pinion 16, Figs. 3 and 6, mounted loosely upon the counter-shaft, is rigidly attached by screw-threads or other means to the gear-wheel $y$. A shaft 17 is journaled in a bearing on the end of an arm 18, which arm encircles and is firmly keyed to the counter-shaft and is provided with a counterweight to balance the said bearing, shaft, and gears thereon. On one end of said shaft is keyed a toothed wheel 19, engaging with the pinion 16, and on the other end is keyed a pinion 20. A toothed wheel 21, fitted to run loosely upon the counter-shaft and engage with the pinion 20, has bolted or otherwise firmly attached to it a friction-ring 22, grooved to receive a band-brake, in a similar manner to the clutch-rings before described. Loosely mounted upon a journal extraneous to the counter-shaft, but preferably upon the motor-shaft, as shown, is a hub 23, carrying an operating-arm 24 and a shorter arm 25. A friction brake-band 26 of similar material and construction to the clutch-bands before described is passed around the ring 22 and has one end hinged to the arm 24 and the other end hinged to the arm 25 in such manner as shown, so that said arm 24, being revolved through an angle of a few degrees toward the rear, draws the said band tightly about the ring.

Pivoted with suitable means for adjustment to the cross-piece $e$ is an elbow-lever 27, one arm of which is forked and provided with pins to engage the groove in the slide-block 13. An operating-lever 28 is fulcrumed at 29 in a position conveniently accessible from the seat, and its lower end is hinged to a connecting-rod 30, which rod has means for adjusting its length and is hinged at its other end to the laterally-projecting arm of the elbow-lever 27. A segment 31, attached to the body of the vehicle, is provided with a notch to engage a spring-latch 32 on the upper end of the lever and hold said lever midway of its stroke, in which position the slide-block 13 does not engage with either clutch.

The reversing-lever 33 is fulcrumed to the frame at 34 and when not in use is held close to the seat by the spring-socket 35. Its lower end is connected by suitable hinge-joints and a rod or pipe 36 with the end of the arm 24.

In the operation of the vehicle, the motor having been started with the lever 28 locked in its central position, should it be desired to go ahead slowly the lever 28 is moved forward, thus forcing the slide-block 13 between the clutch-levers 3 and 4, thereby clamping the wheel $w$ to the counter-shaft. When the said lever 28 is moved backward beyond the notch in the segment, the slide-block is forced between the clutch-levers 10 and 11, thereby clamping the wheel $y$ to the counter-shaft, in which event the vehicle will run at its high speed forward. Should it be desired to run the vehicle backward, the lever 33 is pushed forward, which rocks the hub 23 and tightens the brake-band 26, thereby holding the ring 22, with its gear-wheel 21, from revolving; but the shaft 17 being revolved through the gear-wheels 19, 16, $y$, and $x$, and its pinion 20 being in engagement with the wheel 21, which is held stationary, the said shaft forces the arm 18 to revolve itself and the counter-shaft in a backward direction, thus causing the vehicle to run backward.

Other modes of applying the principles of my invention may be substituted for the modes herein explained. Change may therefore be made in the details of the mechanism disclosed, provided the principles of construction set forth, respectively, in the following claims are employed.

I therefore particularly point out and distinctly claim as my invention—

1. The combination, with a motor-shaft, a counter-shaft suspended therefrom, wheels mounted loosely on the counter-shaft and driven at different speeds by the motor-shaft, and means for revolving the axle or driving-shaft of the vehicle from the counter-shaft, of suitable clutch mechanisms whereby either of the said driven wheels may be clamped to or released from the counter-shaft, and a reversing-gear consisting of a gear-wheel fastened to one of the said driven wheels, a gear-wheel mounted loosely on the counter-shaft, two intermediate gear-wheels having a common journal in an arm secured to the counter-shaft and engaging respectively with the aforesaid gear-wheels, and means whereby the said loosely-mounted gear-wheel may be held from revolving or released at will, substantially as set forth.

2. The combination, with a shaft and a driven wheel mounted loosely thereon, of a toothed gear-wheel fastened to said driven wheel concentric with the shaft, an arm secured to the shaft, a gear-wheel mounted loosely on said shaft, two intermediate gear-wheels having a common journal in said arm and engaging respectively with the aforesaid gear-wheels, and means whereby the said loosely-mounted gear-wheel may be held from revolving or released at will, substantially as set forth.

3. The combination, with a shaft and a driven wheel mounted loosely thereon, of a toothed gear-wheel fastened to said driven wheel concentric with the shaft, an arm secured to the shaft, a gear-wheel mounted loosely on said shaft provided with a friction-ring, two intermediate gear-wheels having a common journal in said arm and engaging respectively with the aforesaid gear-wheels, a band encircling said friction-ring and held from revolving therewith, and means whereby said band may be tightened about the ring or released at the will of the operator, substantially as set forth.

4. The combination, with a motor-shaft, a counter-shaft suspended therefrom, and a wheel mounted loosely on said counter-shaft driven by a wheel on the motor-shaft, of a toothed gear-wheel fastened to said driven wheel, a gear-wheel provided with a friction-ring mounted loosely on the counter-shaft, two intermediate gear-wheels having a common journal in an arm secured to the counter-shaft and engaging respectively with the aforesaid gear-wheels, a hub loosely mounted on the motor-shaft and provided with suitable arms, a band encircling the said friction-ring having its ends hinged respectively to the arms of the said hub, and an operating-lever connected with one arm of said hub whereby the hub may be revolved sufficiently to tighten or loosen the band about the ring, substantially as set forth.

5. The combination, with a shaft carrying a sleeve, and a driven wheel rotatably mounted thereon provided with a clutch-ring on one side and a toothed gear-wheel on the other side thereof both concentric with the shaft, of a pair of lever-arms fulcrumed to the said sleeve extending outwardly and over the clutch-ring, a friction-band sprung around the said ring with its ends hinged respectively to the outer ends of the said lever-arms, a suitable wedge revolving with the shaft, means for forcing said wedge between the inner ends of the lever-arms and releasing the same, a gear-wheel mounted loosely on the shaft, two intermediate gear-wheels having a common journal in an arm secured to the shaft and engaging respectively with the aforesaid gear-wheels, and means whereby the said loosely-mounted gear-wheel may be held from revolving or released at will, substantially as set forth.

6. The combination, with a shaft carrying a sleeve, and a driven wheel rotatably mounted thereon provided with a suitable clutch-ring, of two lever-arms each opposed to the other fulcrumed to the said sleeve and extending outwardly and over the clutch-ring, a friction-band sprung around the said ring with its ends hinged respectively to the outer ends of the said lever-arms, a suitable wedge revolving with the shaft, and means for forcing said wedge between the inner ends of said lever-arms and releasing the same, substantially as set forth.

7. The combination, with a shaft, a sleeve secured thereon, and a driven wheel rotatably mounted on the sleeve provided with a suitable clutch-ring, of two lever-arms each opposed to the other fulcrumed to the sleeve and extending outwardly and over the clutch-ring, a friction-band sprung around the said ring the ends of which are hinged respectively to the outer ends of the said lever-arms, a block fitted to slide upon but revolve with the said shaft provided with a wedge-shaped arm adapted to be forced between the inner ends of the said lever-arms, and suitable means for operating said block, substantially as set forth.

8. The combination, with a shaft, and a driven wheel rotatably mounted thereon provided with a suitable clutch-ring, of a sleeve secured to the shaft, two lever-arms each opposed to the other fulcrumed to the said sleeve and extending outwardly and over the clutch-ring, a friction-band sprung around the said ring having one end hinged to one of said lever-arms, an adjusting-bolt hinged to the other end of said band passing through an eye in the end of the other lever-arm and secured by nuts, a block fitted to slide upon but revolve with the said shaft provided with a wedge-shaped arm adapted to be forced between the inner ends of the said lever-arms, and suitable means for operating said block, substantially as set forth.

9. The combination, with a shaft, sleeves secured thereon, and wheels driven at different speeds rotatably mounted respectively on the said sleeves and provided with clutch-rings on their inside faces, of pairs of lever-arms fulcrumed opposite each other to the inside flanges of said sleeves extending outwardly and over the respective clutch-rings, friction-bands sprung around the said rings each having its ends hinged respectively to the outer ends of a pair of said lever-arms, a block fitted to slide upon but revolve with said shaft provided with wedge-shaped arms adapted to be forced respectively between the inner ends of the said pairs of lever-arms, and suitable means for operating said block, substantially as set forth.

10. The combination, with a shaft, sleeves secured thereon, and wheels driven at different speeds rotatably mounted respectively on the said sleeves and provided with clutch-rings on their inside faces, of pairs of lever-arms fulcrumed opposite each other to the inside flanges of said sleeves extending outwardly and over the respective clutch-rings, friction-bands sprung around the said rings each having its ends hinged respectively to the outer ends of a pair of said lever-arms, a block fitted to slide upon but revolve with said shaft provided with wedge-shaped arms adapted to be forced respectively between the inner ends of the said pairs of lever-arms and provided with a circumferential groove, an elbow-lever fulcrumed to the frame having one arm forked and engaging the groove in the said slide-block, an operating-lever provided with suitable connections with the other arm of said elbow-lever, and means for locking said operating-lever in its central position, substantially as set forth.

In testimony whereof I affix my signature, in the presence of two subscribing witnesses, at Cleveland, Ohio, December 16, 1899.

RAYMOND M. OWEN.

Witnesses:
E. P. DeGALLIEN,
GEO. L. COLBURN.